United States Patent [19]

Wanlass

[11] 4,152,630
[45] May 1, 1979

[54] MULTI-PHASE MOTOR

[76] Inventor: Cravens L. Wanlass, 9871 Overhill Dr., Santa Ana, Calif. 92705

[21] Appl. No.: 790,757

[22] Filed: Apr. 25, 1977

Related U.S. Application Data

[63] Continuation-in-part of Ser. No. 674,406, Apr. 7, 1976, Pat. No. 4,095,149.

[51] Int. Cl.² .............................................. H02P 1/44
[52] U.S. Cl. ................................. 318/796; 318/729; 318/784; 318/772
[58] Field of Search ............ 318/20 A, 220 A, 220 R, 318/221 R, 221 D, 222, 225 R, 228

[56] References Cited

U.S. PATENT DOCUMENTS

| 1,478,012 | 12/1923 | Varley | 318/228 X |
| 1,595,937 | 8/1926 | Hobart | 318/228 |
| 1,978,581 | 10/1934 | Johnson | 318/228 X |
| 2,039,050 | 4/1936 | Ball | 318/228 |
| 3,584,277 | 6/1971 | Teodorescu | 318/222 |

FOREIGN PATENT DOCUMENTS

| 462172 | 2/1951 | Italy | 318/200 |

Primary Examiner—Gene Z. Rubinson
Attorney, Agent, or Firm—Lyon & Lyon

[57] ABSTRACT

A polyphase motor is disclosed in which each coil of the stator winding of, for example, a squirrel cage induction motor is connected in series with a capacitor so that the capacitor, together with the input voltage, causes the stator core to periodically switch from a nonsaturated to a saturated condition and vice-versa so that the flux density is maintained at a uniformly high level. A control winding is provided to generate magnetic flux in the stator to vary the volt-second capacity of the magnetic material of the stator in accordance with varying line, load or other selected conditions. The current in the control winding can be externally controlled or may be provided by a feedback winding wound on the stator.

28 Claims, 11 Drawing Figures

IMPROVED MULTI-PHASE MOTOR

RELATED APPLICATIONS

This is a continuation-in-part of my application Ser. No. 674,406 filed Apr. 7, 1976, now U.S. Pat. No. 4,095,149 the disclosure of which is incorporated by reference herein. The subject matter of this application also relates to the subject matter of my application Ser. No. 597,529 filed July 21, 1975 entitled "Electric Motor Having Controlled Magnetic Flux Density", Now U.S. Pat. No. 4,063,135, the disclosure of which is incorporated by reference herein.

BRIEF SUMMARY OF THE INVENTION

In my aforementioned copending application, there is disclosed an electric motor which is significantly more efficient than those currently available. Briefly, that motor operates by providing a system in which the magnetic flux density in the stator is maintained at a maximum level while the current in the rotor is also maintained at a large magnitude under full load conditions. The flux density in the stator is controlled by means of a capacitor coupled in series with the main stator winding, the capacitor having a value such that the voltage stored therein will, in combination with the input voltage, periodically cause the volt-second capacity of the stator core to be exceeded with the result that the core will periodically change non-linearly from a nonsaturated to a saturated condition and back again. The capacitor acts to limit the amount of energy that can be transferred to the rotor even when the rotor has a very low impedance with the result that rotor current can also be maximized. An auxiliary winding is preferably connected in parallel with the main winding and the capacitor to provide the necessary rotating fields for starting a single phase motor and in addition provides considerably more starting torque for the motor.

While that motor has been found to be extremely satisfactory, I have discovered that even greater operating efficiencies can be obtained by effectively varying the amount of magnetic material available to main motor winding in accordance with the line, load or other selected conditions. By varying the amount of magnetic material that is effectively available, stator magnetic losses and stator copper losses, which make up a significant and uncontrollable portion of the total losses of a conventional motor, can be made to vary with the demands on the motor. In other words, if the motor according to the present invention is operating at no load, the amount of magnetic material effectively available is made rather small so that the stator magnetic losses and stator copper losses are quite low. The magnetic material effectively available, however, is sufficient to produce enough power to drive the motor at no load. When the motor is loaded, the amount of magnetic material available is increased to a point sufficient to still provide sufficient power. Of course, the internal losses of the motor increase during this loading period but still might be less than would be the case if the motor was under full load. Because the losses are made to vary with the load on the motor, and because a motor is rarely operated under full load over its entire operating period, the average internal losses are significantly decreased and the efficiency increased. The result is a motor which is completely satisfactory under any load condition, but which consumes considerably less electrical energy than conventional motors which have essentially the same losses whether they are operating at no load or full load.

Control of the amount of magnetic material effectively available in the motor of the present invention is accomplished by providing the stator with a control winding which, when energized, causes the stator core to be partially saturated, thus effectively reducing the magnetic cross-sectional area of the stator core. This reduction in magnetic cross-sectional area reduces the volt-second capacity of the core with the result that the voltage across the motor is also reduced. This results in the voltage across the capacitor being also reduced since the current must at all times be such that all voltages around the loop must add up to zero. The reduction in capacitor voltage results in a corresponding reduction in the stored energy in the capacitor because of the equation:

$$E = \tfrac{1}{2} CV^2$$

Where E = energy stored;
Where C = capacitance; and
Where V = the capacitor voltage.

The energy now circulated in the motor during each half cycle is greatly reduced and the motor losses are correspondingly reduced.

By making the current in the control winding a function of a motor condition, for example, load, the motor can be made to operate at a very efficient point for all load conditions. Thus, if the motor is not loaded, the control current can be made to be high with the result that the effective cross-sectional area of the core is small so that the circulating energy, and the corresponding losses, are also small. As the load increases, the control current can be made to decrease with the result that the power handling capacity of the motor increases to whatever level is necessary to drive the increased load. The control current, of course, can be made responsive to other motor conditions such as line voltage or speed, or any desired combinations of motor conditions or other desired external conditions.

The present invention can also be applied to polyphase AC motors. It is therefore an object of the present invention to provide an electrical motor which operates very efficiently.

It is another object of the present invention to provide an electrical motor in which the power transferred, and consequently the internal losses, are made to vary in response to the demands made upon the motor.

DESCRIPTION OF THE INVENTION

Figure 1:
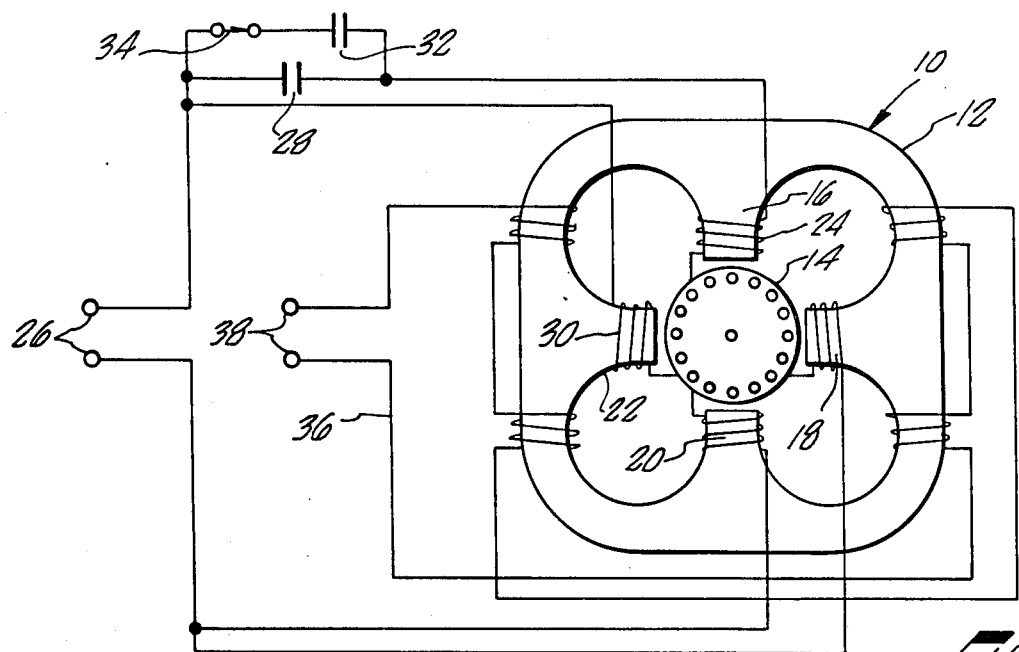
FIG. 1 is a schematic diagram of a simplified version of the present invention.

FIG. 1 illustrates in schematic form a simplified embodiment of the present invention. An AC induction motor of the squirrel cage type is generally indicated at 10 and is diagrammatically shown to have a stator 12 of magnetic material and a squirrel cage rotor 14. The stator is shown as having four pole pieces, 16, 18, 20 and 22 although more or less pole pieces may be used if desired, as will be apparent to those skilled in the art. It will also be apparent to those skilled in the art that the configuration of the pole pieces shown is diagrammatic only. It should be understood that no attempt is made herein to optimize the physical construction of the motor.

The main stator winding 24 is shown as wound on poles 16 and 20 and is connected to input terminals 26 by means of a series capacitor 28. The capacitor need have no particular value, but its capacitance must be large enough to maintain a capacitive power factor in the series circuit comprising this capacitor and the winding 24 during the motor's normal operating mode. An auxiliary winding 30 is wound on pole pieces 18 and 22 and is connected in parallel with winding 24 and capacitor 28. The winding 30 is preferably of considerably higher inductance and impedance than the winding 24. It may, for example, have considerably more turns of finer wire. A starting capacitor 32 is connected across the capacitor 28 by a centrifugal switch 34.

A control winding 36 is wound on the stator core and may be connected to a source of control current through terminals 38. As can be seen, the control winding 36 is wound on the stator core 12 so that the flux generated by the motor windings balance out from an AC flux standpoint and no AC voltage is induced in the control winding 36. It should be understood that the positioning of the coils of the winding 36 as shown in FIG. 1 is diagrammatic only and any suitable winding technique could be used in practice.

The basic mode of operation of the motor of FIG. 1 is described in my aforementioned application. Briefly, when the AC voltage is applied to the terminals 26, the capacitor 28 begins to charge and a current flows through the winding 24. A current also flows through winding 30 which is out of phase with the primarily capacitive current in the winding 24 with the result that a rotating field is created which causes the rotor 14 to begin rotating. At this time, a substantial amount of the driving force is produced by the winding 30 inasmuch as the main winding 24 and capacitor 28 have not yet entered into their normal operating mode. As the rotor speed and the back EMF increase, the effective inductance of the winding 24 becomes such that this winding 24, together with the capacitor 28, goes into its operating mode. In other words, the effective volt-second capacity of the winding 24 and its associated magnetic material becomes sufficiently large to permit the operation of the device its operating mode, i.e., the capacitor 28 will periodically charge, discharge and recharge in the opposite direction causing the magnetic material associated with the winding 24 to switch from a nonsaturated to a saturated condition while maintaining the average flux density quite large.

The winding 36 is used to control the effective cross-sectional area of the magnetic material associated with the winding 24, and hence to control the volt-second capacity of this magnetic material. As can be readily seen, when a relatively large direct current is introduced into the winding 36 through the terminals 38 a relatively large magnetic flux will be generated in the core 12. Thus flux has the same effect as if the amount of magnetic material in the core 12 was physically reduced, i.e., the volt-second capacity of the material is reduced as is the inductance of the winding 24 and the amount of energy that can be stored therein. In effect, the hysteresis loop of the core 12 is tipped over and its area decreased with the result that the inductance of the winding 24 is decreased. The voltage across the capacitor 28 automatically adjusts to compensate for the lower voltage across the now reduced inductance of the winding 24. This occurs because the sum of the input voltage plus the voltage across the winding 24 plus the voltage across the capacitor 28 plus the voltage drop across the accumulated resistance in the circuit must equal zero. Consequently, when the voltage across the winding 24 drops, the voltage across the capacitor 28 must experience a corresponding decrease to keep the loop sum at zero. The capacitor, of course, also serves to limit the current flow and prevents the winding 24 from burning out. The lower voltages in the capacitor and inductor mean that less energy is circulated in the system with the result that a lower current flows. Consequently the stator copper losses are reduced.

The energy that can be transferred by the motor operating with a high control current is, of course, quite sufficient to drive the motor at no load. The losses in the motor will be at an absolute minimum in this operating condition. When it is necessary for the motor to drive a load, the current in the control winding 36 may be reduced thereby increasing the effective cross-sectional area of the magnetic material of the core 12, increasing its volt-second capacity, and increasing the energy transfer capability of the motor. Internal losses will also increase, but these increased losses will prevail only during the time that the effective size of the motor is increased to cope with the increased demand. The average losses of the motor are obviously considerably lower than the losses of a conventional motor which must be designed to have maximum capacity even at no load with the result that it also has almost maximum losses at this point.

A control current can be provided to the terminals 38 in any number of ways as will be apparent to one skilled in the art. The remaining figures of the drawing illustrate various ways in which this can be accomplished although it will be obvious to those skilled in the art that may other approaches are equally satisfactory.

Figure 2:
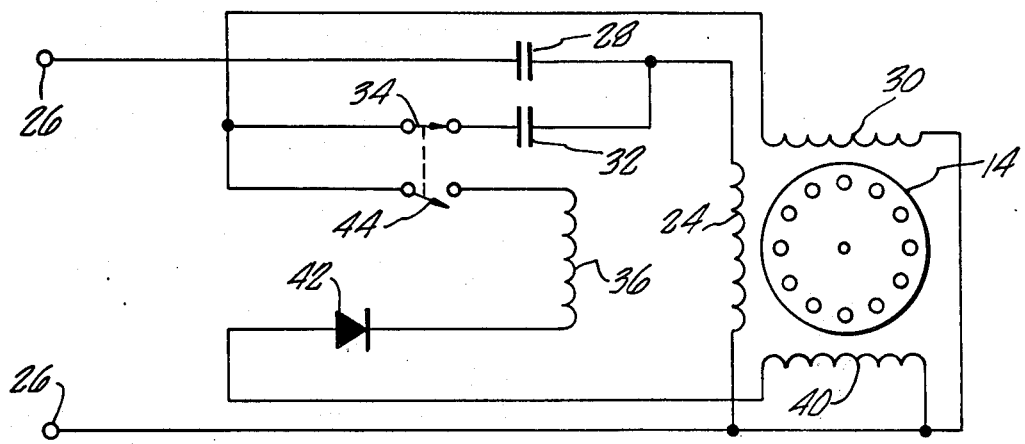
FIG. 2 is a schematic diagram of another embodiment of the present invention.

FIG. 2 illustrates one of the simplest and most effective ways of providing a control current to the winding 36. In this figure, the same reference numerals are used to designate the same elements is those shown in FIG. 1.

A feedback winding 40 has been added to the stator core to generate a voltage proportional to the back EMF generated by the motor. The feedback winding 40 is connected to the control winding 36 by a diode 42 and this entire circuit is connected across the input terminals 26 by a switch 44 which is ganged with the centrifugal switch 34. The switch 44 is not necessary but can be useful in delaying the operation of the control circuit until the motor is up to speed after starting. For this reason, the switch 44 is shown in the open position while the switch 34 is shown in the closed position. Once the motor is up to speed, of course, the switch 34 will open and the switch 44 will close.

Assuming that the motor is running at rated speed and no load, the voltage generated in the winding 40 will exceed the input line voltage with the result that on every other half cycle a direct current will flow in the control winding 36 resulting in a DC magnetic flux being generated in the stator core. As pointed out above, this control flux will result in a reduction of the volt-second capacity of the core and a consequent decrease in the internal losses in the motor. Assume now that the motor is partially loaded. As a result, it will tend to slow down and the back EMF will be reduced. This will result in a lower voltage being induced in the winding 40 with the result that the current flowing through the diode 42 and winding 36 will decrease. The resulting decrease in the control flux in the stator core will release more of the core material for the use of the main motor circuit, the volt-second capacity of the core will increase, and the energy transferred by the motor will increase with the result that the load will be driven at the desired speed. As the load is increased to full load, the control current will be reduced to zero with the result that all of the magnetic material of the stator core will be available for use by the main motor circuit.

Figure 3:
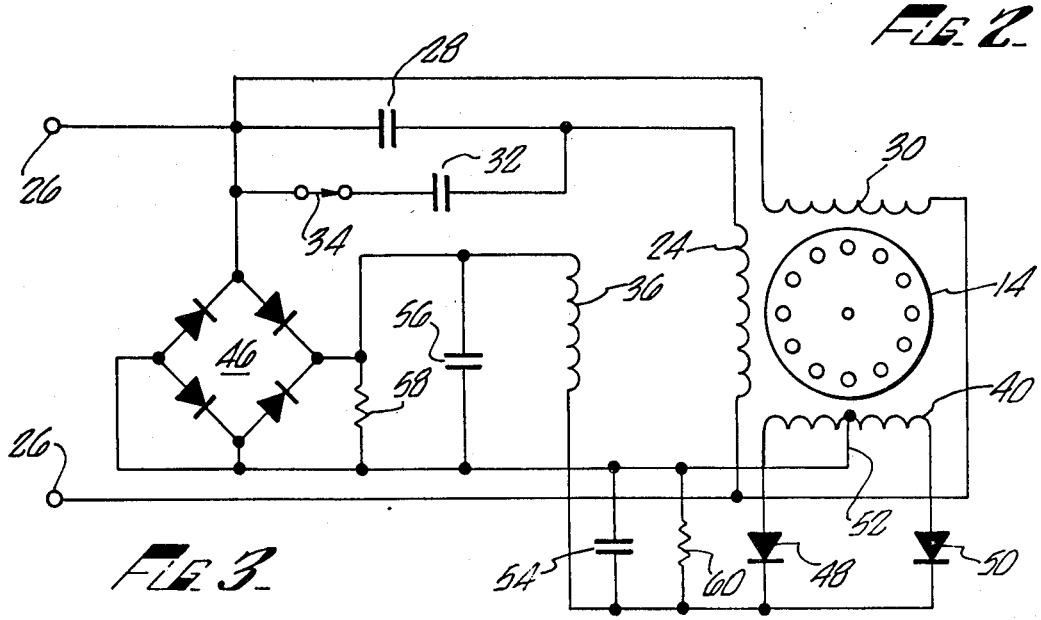
FIG. 3 is a schematic diagram of further embodiment of the present invention.

Because of the wise diversity of motor sizes and designs it is impractical to set forth any particular parameters for the control circuit illustrated in FIG. 2. In general, however, the number of turns on the control winding for any given motor should be such as to provide stable feedback operation without oscillatory conditions, as will be apparent to those skilled in the art. FIG. 3 shows an embodiment of the present invention in which full wave rectifiers are used so that a smooth DC current is passed through the control winding 36. In this figure, the same reference numerals are used for the same elements shown in FIGS. 1 and 2. A full wave rectifier 46 is connected across the input terminals 26 and provides a voltage which is opposed by the voltage produced by a full wave rectifier coupled to the output of the feedback winding 40, the latter rectifier comprising diodes 48 and 50, and midtap connection 52. If desired, filtering capacitors 54 and 56 and also be used. Resistances 58 and 60 are provided to permit the full wave rectifiers to conduct. As can be seen, if the voltage induced in the winding 40 is equal to the innput voltage, no current will flow in control winding 36. If, however, these two voltages do not balance, a current will flow in the control winding 36 with the result that a control flux will be generated in the stator core. This control system would result in the voltage induced in the feedback winding being kept equal with the input voltage regardless of line voltage or load changes. Therefore, if this motor is designed to achieve this balance at full load, any deviation of either the line or the load conditions will cause a control current to flow in the control winding 36 to bring the system back into balance. For example, if the load is removed from the motor, the rotor would speed up, thus increasing the feedback voltage. A current will flow in the control winding, the volt-second capacity of the stator core will be reduced, as will the energy transferred by the system, with the result that internal losses will be reduced in the manner described above. If desired, a diode such as the diode 42 can be provided in the current FIG. 3. If the diode is poled in the direction of current flow from the winding 40 to the full wave rectifier 46, the control circuit will respond to changes in load in the same manner as described in connection with FIG. 2. If the diode is poled in the opposite direction, the contol circuit will respond to changes in line voltage.

Figure 4:
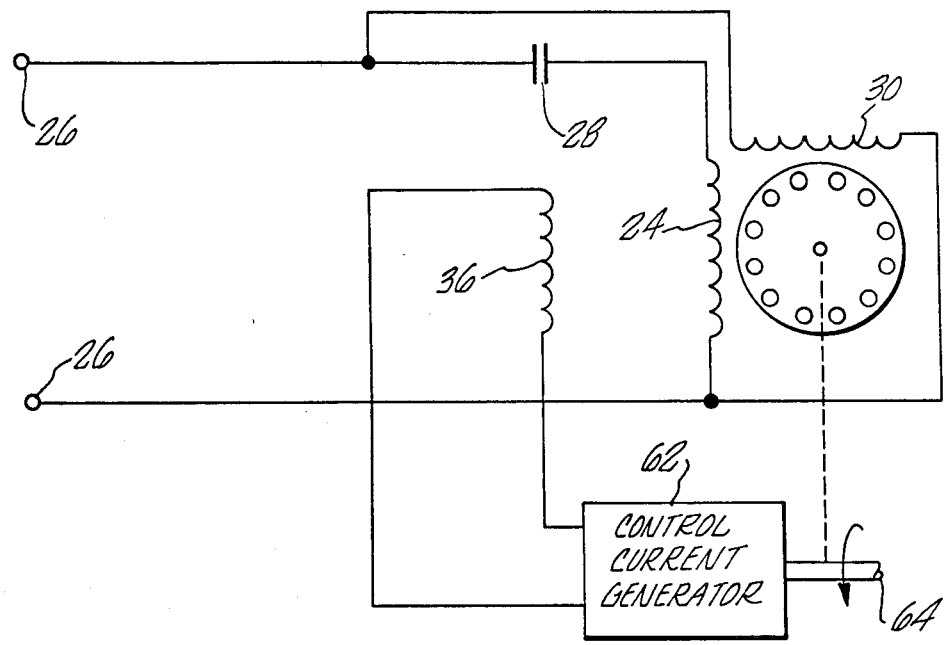
FIG. 4 is a schematic diagram of an additional embodiment of the present invention in which the system is responsive to the RPM of the motor.

FIG. 4 illustrates a modification of the present invention wherein a current is supplied to the control winding 36 by a control current generator 62 energized by a shaft 64 which is driven by the rotor 14. The system is thus responsive to the RPM of the motor the control current generator 62 being designed to generate a current that decreases as the RPM of the motor decreases.

Figure 5:
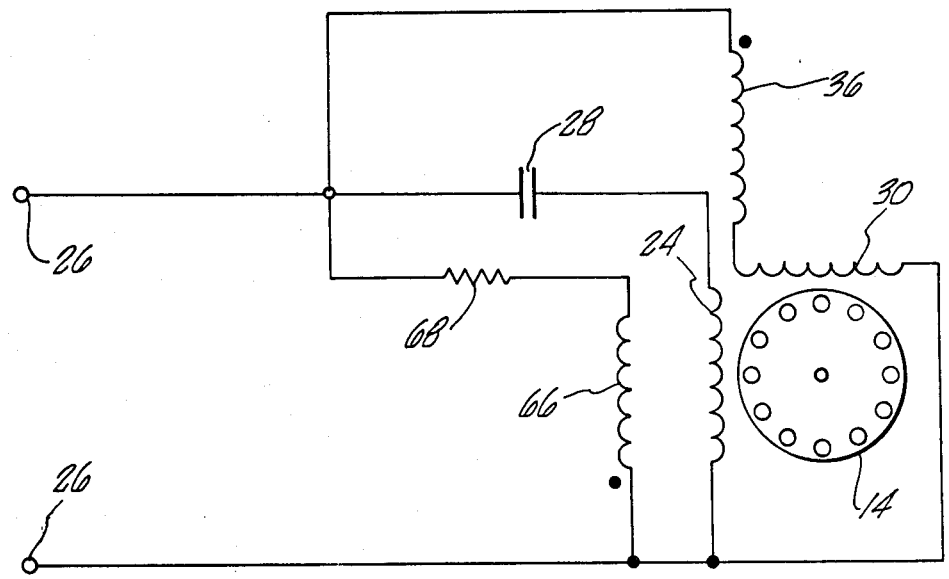
FIG. 5 is a schematic diagram of an embodiment of the present invention in which the system is responsive to changes in line current.

FIG. 5 shows a modification of the present invention that responds to changes in line current. In this embodiment, the control winding 36 is connected in series with the auxiliary winding 30. A second control winding 66, poled in a direction opposite to that of winding 36 is connected across the input terminals 26 by a current limiting resistor 68. The current through the winding 66 generates a first flux component in the stator core while the current through the winding 36 generates a flux component in the opposite direction. The windings are selected so that at no load, the flux component generated by the winding 66 prevails and a substantial AC control flux is present in the stator core with the result that the volt-second capacity of the core is low. As the motor is loaded and begins to slow down more current is drawn by the auxiliary winding 30 with the result that the flux component generated by the winding 36 increases and the net control flux in the core decreases so that more energy can be transferred. As the load on the motor reaches its rated value, the flux components generated by the windings 66 and 36 become equal, so that the motor attains its maximum energy transfer condition.

It will be clear from the forgoing description that any desired method of deriving the control current from any desired source may be used in connection with the present invention. It should further be understood that the control current need not be direct current but could be alternating current, or could be controlled by pulse width modulation, etc.

The present invention can equally well be used in connection with three phase or other polyphase motors with one capacitor being provided per phase. FIGS. 6 through 11 illustrate in schematic form various embodiments of three phase motors according to the present invention. In each of FIGS. 6 through 11, the three coils making up the main stator winding are designated 24a, 24b, and 24c, the three capacitors connected to series with these coils are designated 28a, 28b, and 24c, respectively. In the case of such polyphase motors, no starting of winding is necessary, but the use of an auxiliary winding is still beneficial for the reasons previously stated. Only one control winding 36 appears to be required. FIGS. 6, 7, 8 and 9 show such auxiliary windings, one winding or coil for each phase, these coils being designated as 30a, 30b and 30c. Although three auxiliary windings are illustrated, it appears that only one such winding would be necessary to obtain many of the benefits desired. In each figure, the windings are shown connected to appropriate input terminals A, B, C, and D which correspond to the input terminals 26 in FIGS. 1 and 2 except, of course, that they are adapted to be connected to a source of three phase voltage rather than single phase voltage.

Figure 6:
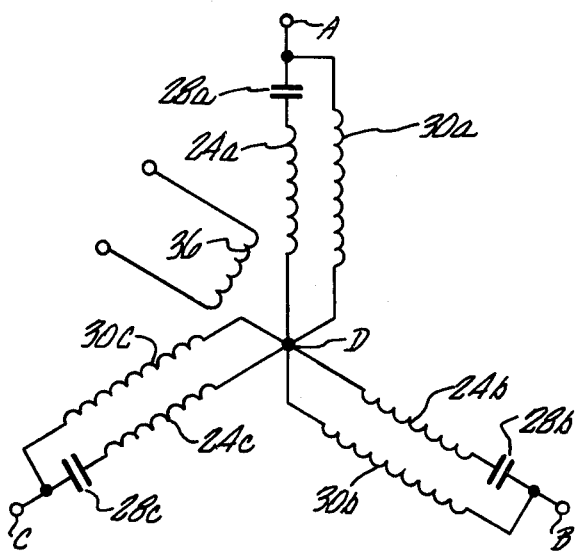
FIG. 6 is a schematic diagram of a first embodiment of a polyphase motor according to the present invention.
Figure 8:
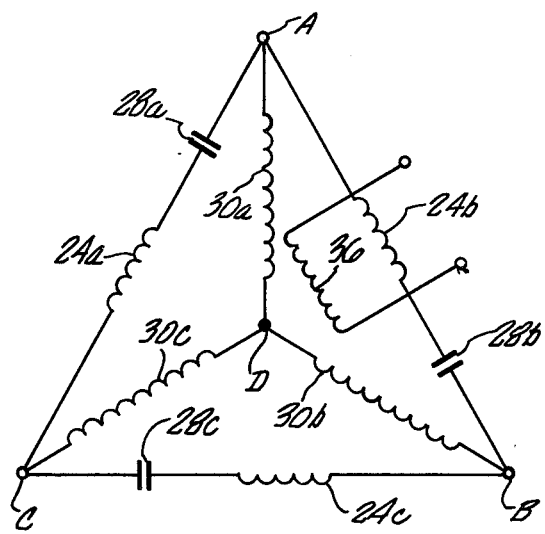
FIG. 8 is a schematic diagram of a third embodiment of a polyphase motor according to the present invention.
Figure 9:
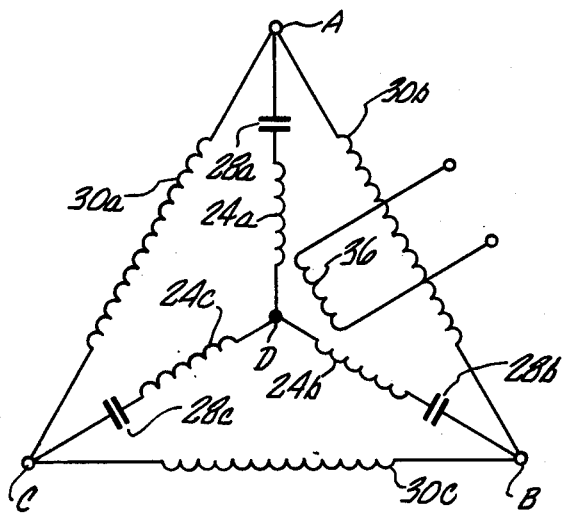
FIG. 9 is a schematic diagram of a fourth embodiment of a polyphase motor according to the present invention.
Figure 7:
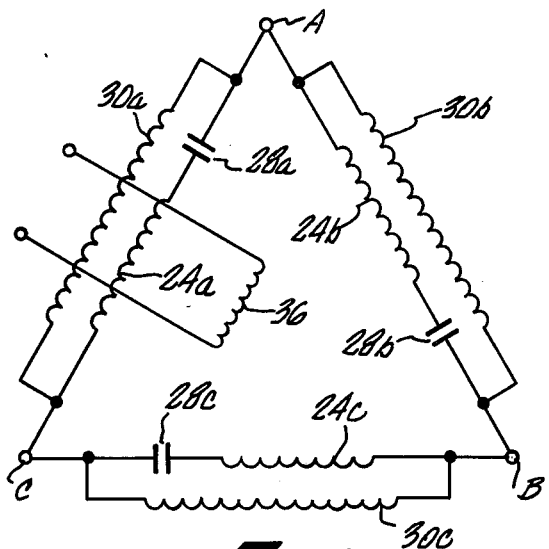
FIG. 7 is a schematic diagram of a second embodiment of a polyphase motor according to the present invention.

It is not believed that any extended discussion of the embodiments of FIGS. 6 through 11 is necessary as their characteristics, construction and operation will be obvious to one skilled in the art in view of the foregoing description of the single phase embodiment of the motor of the present invention. Briefly, FIG. 6 shows a three phase motor in which the stator and auxiliary windings are wound in a double wye configuration; FIG. 7 shows these windings wound in a double delta configuration; FIG. 8 shows the main stator coils 24a, 24b and 24c connected in a delta configuration with the auxiliary coils 30a, 30b and 30c connected in a wye configuration; and FIG. 9 shows the converse of FIG. 8, that is, the main stator coils are connected in a wye configuration with the auxiliary windings connected in a delta configuration.

Figure 10:
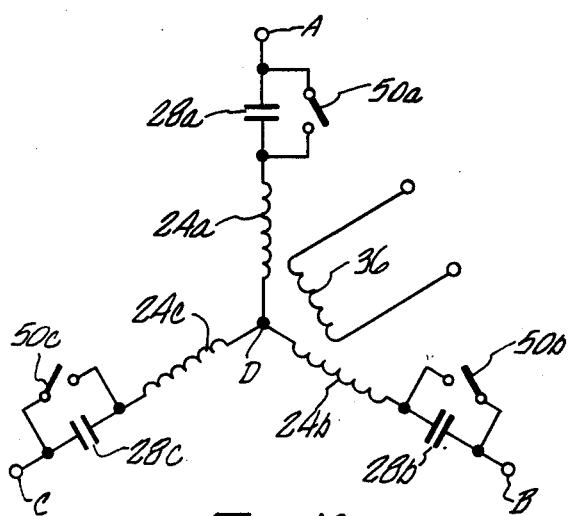
FIG. 10 is a schematic diagram of a fifth embodiment of a polyphase motor according to the present invention.
Figure 11:
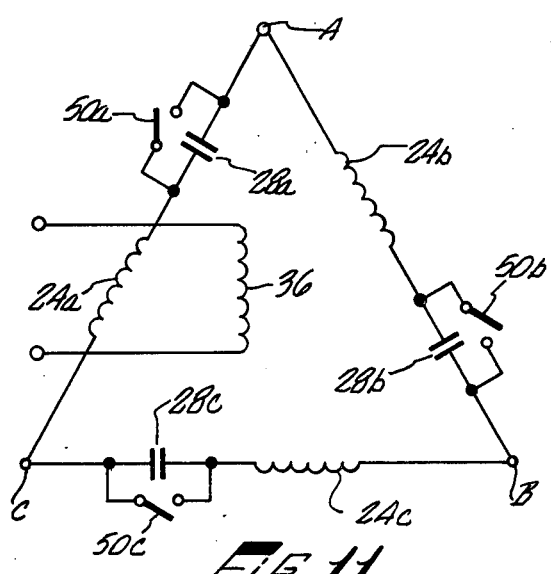
FIG. 11 is a schematic diagram of a sixth embodiment of a polyphase motor according to the present invention.

FIGS. 10 and 11 are embodiments of the invention in which no auxiliary windings are used, FIG. 10 showing the main stator coils being connected in a wye configuration and FIG. 11 showing these coils being connected in a delta configuration. In each of FIGS. 10 and 11 the capacitors 28a, 28b and 28c are shown as being shunted by switches 50a, 50b and 50c. These switches are preferably centrifugally operated so that they are closed when the motor is starting and coming up to speed, and opened at normal running speed. By shorting out the capacitors during starting, the motor is permitted to operate as a conventional polyphase motor during starting so that it will have a starting torque equivalent to conventional motors. Upon approaching running speed, the shunt paths around the capacitors will be opened and the motor will go into the operating mode as previously described. If low starting torque can be accommodated, the switches 50a, 50b and 50c can be eliminated.

No attempt has been made to illustrate the manner in which the three coils of the polyphase main stator winding would be physically wound on the stator core as any conventional technique such as lap windng or wave winding would be satisfactory as will be readily apparent to one skilled in the art. The manner in which the control winding would be wound on the core would also depend on the particular design features of any particular motor, but preferably would be wound around the core along its length as shown in FIG. 1 and in such a manner that induced voltages would be cancelled out. The construction of the rotor has not been illustrated as any suitable rotor, i.e., a squirrel cage or wound rotor could be used. It should be understood that while the foregoing description of the operation of the motor is believed to best describe the physical phenomena present in its operation, it is not meant in any way to limit the scope of the present invention, and that the operation of the motor may some day be better explained. It should also be understood that the invention is not limited to the particular physical constructions of the motor illustrated and described. The foregoing description is thus meant to be illustrative and exemplary only and not restrictive.

I claim:

1. A polyphase electric motor comprising:

a stator including a core of magnetic material;
   a rotor;
   a main polyphase stator winding wound on said core and encompassing said magnetic material, said winding comprising a plurality of coils, each coil representing a single phase;
   a plurality of input terminals adapted to be connected to a source of polyphase AC voltage;
   a plurality of capacitors;
   means connecting each of said coils in a series circuit with one of said capacitors and said series circuits being connected with said input terminals;
   each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage; and
   means for introducing a control flux into said magnetic material to vary the amount of magnetic material effectively encompassed by said main stator winding.

2. The motor of claim 1 wherein said means for introducing a control flux comprises a control winding wound an said stator core encompassing said magnetic material and means for supplying a control current to said control winding.

3. The motor of claim 2 in which switch means are provided in shunt with each of said capacitors.

4. The motor of claim 3 in which said switch means are centrifugally operated and are closed at starting.

5. The motor of claim 2 in which said coils and their associated capacitors are connected in a wye configuration.

6. The motor of claim 2 in which said coils and their associated capacitors are connected in a delta configuration.

7. The motor of claim 2 in which at least one auxiliary winding is wound on said core to encompass said magnetic material and connected to a pair of said input terminals.

8. The motor of claim 2 in which said coils and their associated capacitors are connected to said input terminals in a wye configuration, and in which a plurality of auxiliary windings are wound on said core to encompass said magnetic material, each of said auxiliary windings being connected in parallel with one of said series circuits.

9. The motor of claim 2 in which said coils and their associated capacitors are connected to said input terminals in a delta configuration, and in which a plurality of auxiliary windings are wound on said core to encompass said magnetic material, each of said auxiliary windings being connected in parallel with one of said series circuits.

10. The motor of claim 2 in which a plurality of auxiliary windings are wound on said core to encompass said magnetic material, said coils and their associated capacitors being connected to said input terminals in a wye configuration and said auxiliary windings being connected to said input terminals in a selta configuration.

11. The motor of claim 2 in which a plurality of auxiliary windings are wound on said core to encompass said magnetic material, said coils and their associated capacitors being connected to said input terminals in a delta configuration and said auxiliary windings being connected to said input terminals in a wye configuration.

12. A polyphase electric motor comprising:
a stator including a core of magnetic material;
a rotor, and an air gap between the stator and rotor;
a main polyphase stator winding wound on said core and encompassing said magnetic material such that the flux path of the main winding includes the air gap and links the rotor, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals, and
means for introducing a control flux into said magnetic material to vary the amount of magnetic material effectively encompassed by said main stator winding without substantially generating control flux in said air gap or linking the rotor.

13. The motor of claim 12 wherein said means for introducing a control flux comprises a control winding wound on said stator core encompassing said magnetic material such that the flux path of the control winding does not substantially include the air gap or link the rotor, and means for supplying a control current to said control winding.

14. The motor of claim 13 in which switch means are provided in shunt with each of said capacitors.

15. The motor of claim 14 in which said switch means are centrifugally operated and are closed at starting.

16. The motor of claim 13 in which said coils and their associated capacitors are connected in a wye configuration.

17. The motor of claim 13 in which said coils and their associated capacitors are connected in a delta configuration.

18. The motor of claim 13 in which at least one auxiliary winding is wound on said core to encompass said magnetic material and connected to a pair of said input terminals.

19. The motor of claim 13 in which said coils and their associated capacitors are connected to said input terminals in a wye configuration, and in which a plurality of auxiliary windings are wound on said core to encompass said magnetic material, each of said auxiliary windings being connected in parallel with one of said series circuits.

20. The motor of claim 13 in which said coils and their associated capacitors are connected to said input terminals in a delta configuration, and in which a plurality of auxiliary windings are wound on said core to encompass said magnetic material, each of said auxiliary windings being connected in parallel with one of said series circuits.

21. The motor of claim 13 in which a plurality of auxiliary windings are wound on said core to encompass said magnetic material, said coils and their associated capacitors being connected to said input terminals in a wye configuration and said auxiliary windings being connected to said input terminals in a delta configuration.

22. The motor of claim 13 in which a plurality of auxiliary windings are wound on said core to encompass said magnetic material, said coils and their associated capacitors being connected to said input terminals in a delta configuration and said auxiliary windings being connected to said input terminals in a wye configuration.

23. A polyphase electric motor comprising:
a stator including a core of magnetic material;
a rotor, and an air gap between the stator and rotor;
a main polyphase stator winding wound on said core and encompassing said magnetic material such that the flux path of the main winding includes the air gap and links the rotor, said winding comprising a plurality of coils, each coil representing a single phase;
a plurality of input terminals adapted to be connected to a source of polyphase AC voltage;
a plurality of capacitors;
means connecting eachh of said coils in a series circuit with one of said capacitors, and said series circuits being connected in a wye configuration with said input terminals, and said capacitors being capable of being charged so that the stator core will periodically change nonlinearly from a nonsaturated to a saturated condition;
means for introducing a control flux into said magnetic material to vary the amount of magnetic material effectively encompassed by said main stator winding without substantially generating control flux in said air gap or linking the rotor; and
an auxiliary polyphase auxiliary winding comprising a plurality of coils with each coil representing a single phase, said coils of the auxiliary winding being connected in a wye configuration with said input terminals.

24. A polyphase electric motor comprising:
a stator including a core of magnetic material;
a rotor, and an air gap between the stator and rotor;
a main polyphase stator winding wound on said core and encompassing said magnetic material such that the flux path of the main winding includes the air gap and links the rotor, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors, and said series circuits being connected in a delta configuration with said input terminals, and said capacitors being capable of being charged so that the stator core will periodically change nonlinearly from a nonsaturated to a saturated condition;
means for introducing a control flux into said magnetic material to vary the amount of magnetic material effectively encompassed by said main stator winding without substantially generating control flux in said air gap or linking the rotor; and
an auxiliary polyphase auxiliary winding comprising a plurality of coils with each coil representing a single phase, said coils of the auxiliary winding being connected in a delta configuration with said input terminals.

25. A polyphase electric motor comprising:
a stator including a core of magnetic material;
a rotor, and an air gap between the stator and rotor;
a main polyphase stator winding wound on said core and encompassing said magnetic material such that the flux path of the main winding includes the air gap and links the rotor, said winding comprising a plurality of coils, each coil representing a single phase;

a plurality of input terminals adapted to be connected to a source of polyphase AC voltage;

a plurality of capacitors;

means connecting each of said coils in a series circuit with one of said capacitors, and said series circuits being connected in a delta configuration with said input terminals;

means for introducing a control flux into said magnetic material to vary the amount of magnetic material effectively encompassed by said main stator winding without substantially generating control flux in said air gap or linking the rotor; and an auxiliary polyphase auxiliary winding comprising a plurality of coils with each coil representing a single phase, said coils of the auxiliary winding being connected in a wye configuration with said input terminals.

26. An electric motor as in claim 25 wherein each of said capacitors is capable of being charged so that the stator core will periodically change nonlinearly from a nonsaturated to a saturated condition.

27. A polyphase electric motor comprising:

a stator including a core of magnetic material;

a rotor, and an air gap between the stator and rotor;

a main polyphase stator winding wound on said core and encompassing said magnetic material such that the flux path of the main winding includes the air gap and links the rotor, said winding comprising a plurality of coils, each coil representing a single phase;

a plurality of input terminals adapted to be connected to a source of polyphase AC voltage;

a plurality of capacitors;

means connecting each of said coils in a series circuit with one of said capacitors, and said series circuits being connected in a wye configuration with said input terminals;

means for introducing a control flux into said magnetic material to vary the amount of magnetic material effectively encompassed by said main stator winding without substantially generating control flux in said air gap or linking the rotor; and an auxiliary polyphase auxiliary winding comprising a plurality of coils with each coil representing a single phase, said coils of the auxiliary winding being connected in a delta configuration with said input terminals.

28. An electric motor as in claim 27 wherein each of said capacitors is capable of being charged so that the stator core will periodically change nonlinearly from a nonsaturated to a saturated condition.

* * * * *